United States Patent [19]
Hines et al.

[11] Patent Number: 5,249,550
[45] Date of Patent: Oct. 5, 1993

[54] DISPOSABLE LITTER BOX

[76] Inventors: Lisa C. Hines; Charles B. Hines, both of 10940 Meadowglen La., Houston, Tex. 77042

[21] Appl. No.: 944,608

[22] Filed: Sep. 14, 1992

[51] Int. Cl.⁵ .................. A01K 1/015; A01K 29/00; B65D 5/00
[52] U.S. Cl. ............................ 119/168; 119/165; 229/101; 229/186; 229/178
[58] Field of Search ................. 119/168, 165; 206/459.5; 229/101, 186, 178

[56] References Cited

U.S. PATENT DOCUMENTS

| | | | |
|---|---|---|---|
| 3,154,052 | 10/1964 | Sweeney | 119/168 |
| 3,386,644 | 6/1968 | Zackheim | 229/186 |
| 3,730,338 | 5/1973 | Chesky | 206/459.5 |
| 3,764,060 | 10/1973 | Ruda | 206/459.5 |
| 4,136,817 | 1/1979 | Perry | 229/101 |
| 4,548,160 | 10/1985 | Feitelson | 119/168 |
| 4,791,883 | 12/1988 | Lehman | 229/101 |
| 4,807,563 | 2/1989 | Berry et al. | 119/168 |
| 4,813,376 | 3/1989 | Kaufman et al. | 119/168 |
| 4,890,576 | 1/1990 | James | 119/168 |

Primary Examiner—John G. Weiss
Attorney, Agent, or Firm—Butler & Binion

[57] ABSTRACT

A disposable litter box is defined by a foldable closed container and includes a supply of litter. The box is adapted to be unfolded into a unitary litter box having a continuous outer perimeter of even height for defining an open topped litter box for use by pets and the like. After use is completed, the box may be refolded to confine the soiled litter, which may then be readily disposed. Visual indicators are provided to facilitate closing the box.

16 Claims, 3 Drawing Sheets

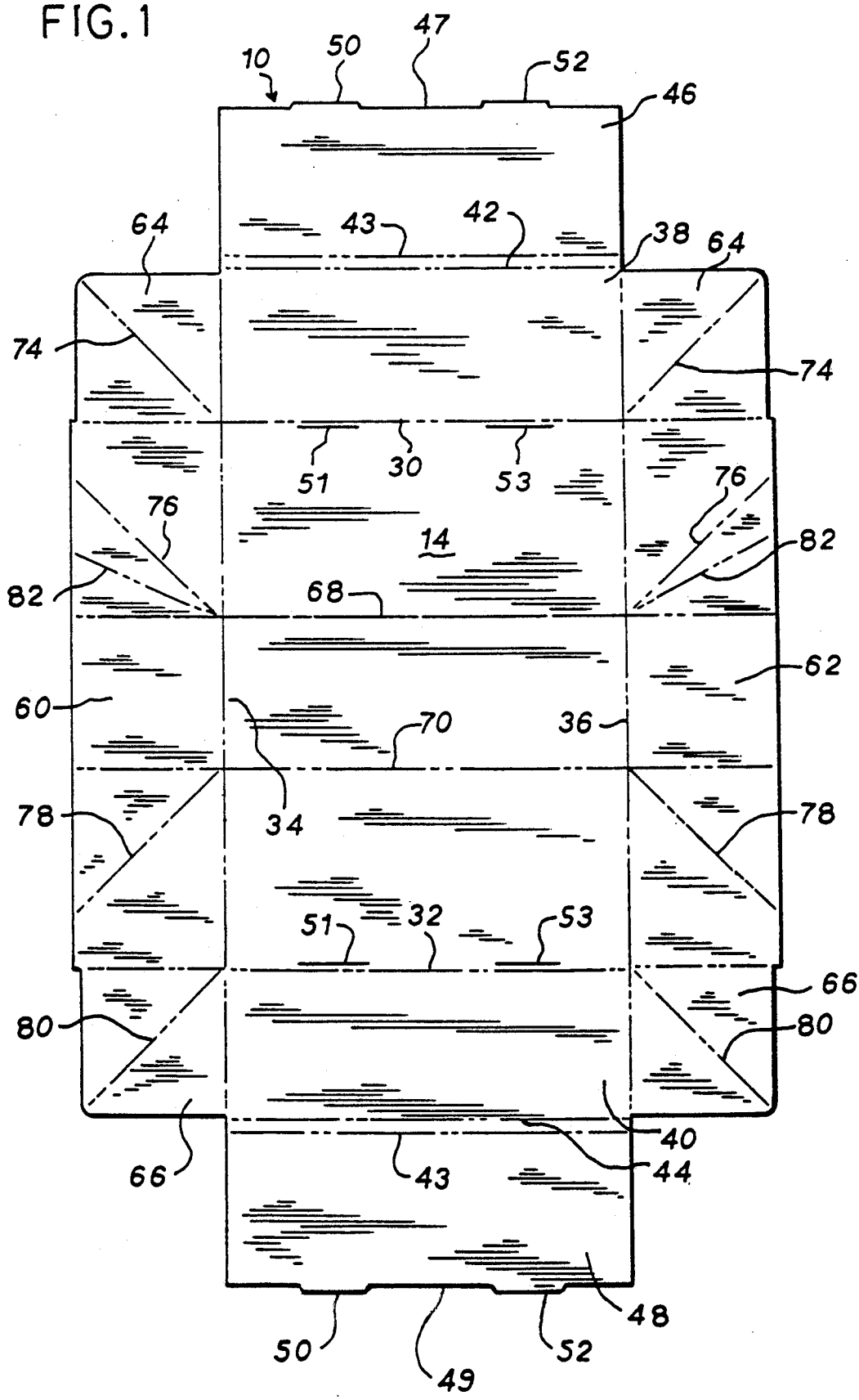

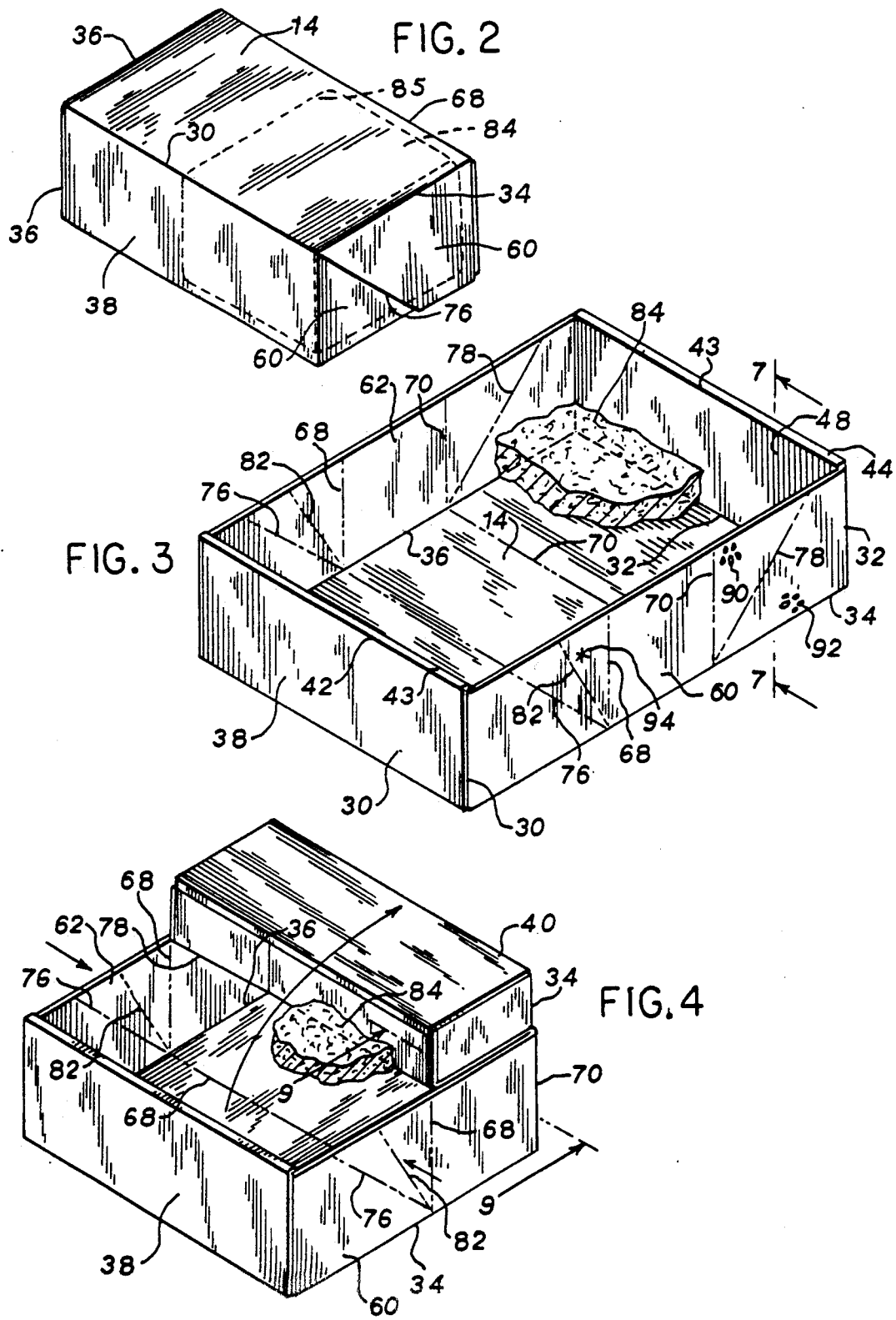

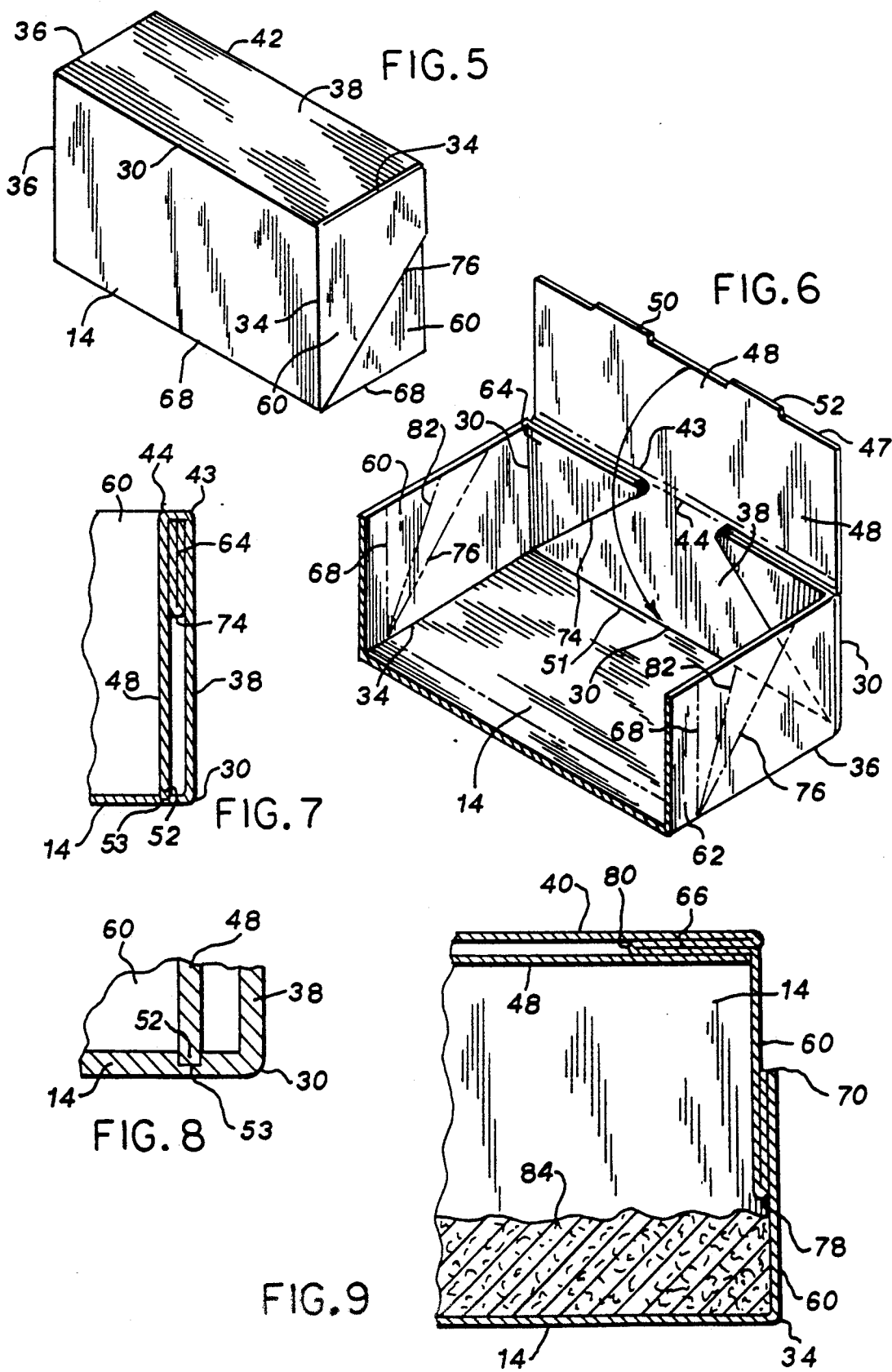

DISPOSABLE LITTER BOX

BACKGROUND OF THE INVENTION

1. Field of the Invention

This invention is directed to pet litter boxes and is specifically directed to a disposable litter box containing a supply of granular litter.

2. Description of the Prior Art

It is well known to use litter boxes containing granular litter for pets confined to an indoor environment. Typically, the granular litter includes odor absorbing materials and is often perfumed or scented to camouflage the soiled litter odor. In most cases, it is necessary for the pet owner to clean out the litter box by scooping or dumping the litter into a trash container or the like for proper disposal. This is a messy, unsanitary and undesirable chore.

In the past, disposable litter boxes have been developed, as shown, by way of example, in U.S. Pat. No. 4,890,576 issued to David F. James on Jan. 2, 1990. As there shown, the litter box is a paper board container which is adapted to be folded into a closed container for point of sale display and transporting the litter to the point of use. The box may then be unfolded to form a typical litter box for a cat or the like. Upon completion of use, the box then may be refolded for disposal, with the soiled litter retained in the box.

While the litter box disclosed in the James patent does provide a disposable container, it has several features which make it unattractive for widespread acceptance by pet owners. Specifically, due to the configuration of the box, it is difficult to open and close the box with the litter in place. A second disadvantage is that the exterior perimeter of the opened box is not flat, and is not shaped in the manner consistent with litter boxes which pets are normally used to using. This can cause difficulty in training the pet to use the disposable type litter box.

An additional disadvantage to the James box is the method of closing the box which requires various tabs to be inwardly folded and the various panels of the box to be positioned properly to assure proper closure, requiring substantial handling of the box after it has been soiled in order to accomplish disposal.

SUMMARY OF THE SUBJECT INVENTION

The disposable litter box of the subject invention is designed to be biased in either the closed or open position by providing counterbiased fold lines defining an integral over-center type spring hinge which normally biases the box in either the opened or closed position, greatly facilitating the use of the box as a disposable litter carrier.

In the preferred embodiment of the invention, the litter box is defined by a foldable, closed container adapted for carrying a supply of litter. The container is adapted to be readily unfolded into a unitary litter box having a continuous outer perimeter wall of even height for defining an open topped litter box. The box may be made of a semi-rigid, non-stretchable, single ply material such as box paper board or the like with a plurality of fold lines specifically positioned on the base for folding the box into an open topped litter box in one configuration and a closed litter carrying container in the second configuration. Where desired, the box may be made of a biodegradable material, further enhancing the disposable features of the invention.

It is an important feature of the subject invention that visual identification elements are provided on the box for positioning the fold lines relative to one another to facilitate in closing and opening the litter box.

In the preferred embodiment, the unitary base includes a substantially rectangular center panel having opposite side and end edges for defining the bottom of the box. A pair of substantially rectangular inner end panels are disposed at the outer end edges of the base and have one edge common therewith. A pair of substantially rectangular outer end panels are connected along the parallel edge of the inner rectangular end sections, whereby the ends may be double folded to provide a two-ply end wall, increasing rigidity in the area where the pet generally enters and leaves the box. The side sections are also generally rectangular panels having one common side edge with the base. The side panels are adapted to be folded upwardly, with the end panels thereof folded inwardly over the end edges, after which the rectangular end sections are folded for sandwiching the end panels to define the box. The upper exposed edges of the panels define the top of the open box and are of even weight.

A plurality of spaced apart major fold lines are provided on the base and rectangular side panels for defining the box. A plurality of minor fold lines are provided in the side panels and intersect the major fold lines to define fold lines for folding the opened topped box into a closed container for housing the litter at point-of-sale and for later disposal.

It is, therefore, an object and feature of the subject invention to provide a disposable litter box having a continuous open upper edge of even height.

It is a further object and feature of the subject invention to provide a disposable litter box which may be quickly and readily opened and closed, facilitating the use of the box as a disposable container.

Other objects and features of the invention will be readily apparent from the accompanying drawing and detailed description of the preferred embodiment.

BRIEF DESCRIPTION OF THE DRAWINGS

FIG. 1 is a flat form with score lines and panels and adapted to be folded into the disposable litter box of the preferred embodiment.

FIG. 2 is a perspective view of the disposable litter box, made from the form of FIG. I, and shown in the closed container configuration.

FIG. 3 is a perspective view of the litter box of FIG. 2 shown in the open topped box configuration.

FIG. 4 is a perspective view similar to FIG. 2, showing the closed container as it is being opened.

FIG. 5 is a perspective view of the box of FIG. 2, rotated 90° from the orientation of FIG. 2.

FIG. 6 is a perspective view showing the position of the base, side and end panels for defining a double ply end wall for the litter box of the preferred embodiment.

FIG. 7 is a sectional view taken generally along the line 7—7 of FIG. 3.

FIG. 8 is an enlarged fragmentary view looking in the same direction as FIG. 7.

FIG. 9 is a sectional view taken generally along the line 9—9 of FIG. 4.

DETAILED DESCRIPTION OF THE PREFERRED EMBODIMENT

The foldable form for constructing the disposable litter box of the subject invention is shown in FIG. 1. As shown, the box form comprises a single sheet 10 of planar material, such as sheet paper or corrugated box paper or the like. It is desirable that the board be of a biodegradable material. The sheet includes a center panel 14 having outer end boundaries 30 and 32 and outer side boundaries 34 and 36 for defining the substantially rectangular box bottom. The boundaries 32, 32, 34 and 36 of the center panel 14 are scored for defining fold lines.

Adjacent the end boundaries 30 and 32 of the center panel are a pair of inner end panels 38 and 40, respectively. The end panels 38 and 40 are also substantially rectangular in shape, each having one boundary common with the respective outer end boundaries 30 and 32 of the center panel 14. The outer boundaries 42 and 44 of the respective inner end panels 38 and 40 are common with a pair of outer end panels 46 and 48 respectively. The outer end panels 46 and 48 are also substantially rectangular and include outer boundaries 47 and 49 which define the end edges of the form 14. The common boundaries 42 and 44 of the respective adjacent panels 38 and 46 and adjacent panels 40 and 48 are scored to define fold lines.

It will be noted that the outer boundaries 47 and 49 of the outer end panels 46 and 48 each include a plurality of outwardly 15 extending tabs 50 and 52. There is also included a second score line 43 on each outer end panel 46, 48 and positioned in parallel, spaced relationship with the respective panel boundaries 42 and 44.

The side boundaries 34 and 36 of the center panel 14 are adjacent to and co-extensive with the side boundaries of rectangular side panels 60 and 62, respectively. The side panels 60 and 62 are adapted to be folded along the respective fold lines 34 and 36 to provide the upstanding sidewalls of the box. It will be noted the outermost sub-panels 64 and 66 of each side panel 60 and 62, respectively, extend into and are substantially co-extensive with the inner end panels 38 and 40.

A pair of additional scored lines 68, 70 are scored on the sheet 10 and pass through center panel 14. Lines 68, 70 are parallel to the end boundaries or end edges 30 and 32 of the center panel 14, and define additional fold lines. Each of the fold lines 68, 70 extend into and through the side panels 60 and 62.

A plurality of secondary fold lines 74, 76, 78 and 80 are provided in the side panels 60 and 62. Each extends a from a point where the respective fold lines 34 and 36 are intersected by one of the fold lines 30, 68, 70 and 32. A tertiary fold line 82 is provided between each secondary fold line 76 and the corresponding primary fold line 68.

In order to construct the box from the form 12, the side panel 60 and 62 are folded along the respective lines 34 and 36 into an upstanding position. The end panels 38 and 40 are then folded upwardly to provide end walls for the box. At this point, the sub-panels 64 and 66 of the respective side edges are folded inwardly into the end panels 38 and 40 by folding the panels 64 and 66 along the secondary fold lines 74 and 80, respectively. The outer end panels 46 and 48 are then folded at lines 42 and 44, respectively, and at lines 43 over the sub-panels 64 and 66 to sandwich the sub-panels 64 and 66 therebetween, as shown in FIG. 6.

A pair of through slots 51 and 53 are provided in the center panel 14 adjacent each end boundary 30 and 32. Tabs 50 and 52 of each outer end panel 46 and 48 are adapted to be inserted in the receptive slots 51 and 53 to hold the box in its assembled configuration.

The litter supply 84 may then be placed in the open box and the box folded along lines 68, 70, 76, 78 and 82 into the closed configuration shown in FIG. 1 for defining a point-of-sale display, as will now be explained. Typically, the litter supply 84 is in a sealed container 85 which may be torn or cut open once the box is placed in use. As shown in FIG. 2, the box is folded into the closed container configuration for housing the packet of granular litter 84 for point-of-sale display. Once the box is positioned at a point-of-use, end panel 38 is lifted and unfolded along fold line 68 and then again along fold line 70, as shown in FIG. 3, to provide the open topped litter box as shown. It will be noted that the outer edges of panels 60 and 62 are in alignment with the fold lines 42, 43 and 44 of the end panels, providing an open top litter box with an outer perimeter of even height. At this point the granular litter 84 may be distributed throughout the box for use.

Upon completion of use, the litter may be moved to one end of the box by simply tilting the box, after which the fold line 78 is used to begin the closure of the box. In the preferred embodiment, a pair of "cats paws" or other visual indicators are shown at 90 and 92 (FIG. 3) for indicating where the box is first grasped in order to close it for disposal. Basically, paw indicator 90 is folded downwardly toward paw indicator 92, causing the box to fold about the fold lines 78 and the center panel 14 to lift (as drawn). A second visual indicator is provided at 94 for indicating that the user should push with his/her thumbs on this point causing a double fold at lines 76 and 82, permitting the box to be reclosed into the container configuration of FIG. 2 for disposal. By utilizing the double fold lines 76 and 82, an over-center type hinged closure mechanism is provided, holding the box in either the closed position of FIG. 2 or the open position of FIG. 3, without additional securing devices. This greatly facilitates the use of the litter box as a disposable container, making the box easy to use while safely containing the contents for disposal.

While certain objects and features of the invention have been described in detail herein, it should be readily understood that this invention includes all modifications and enhancements within the scope and spirit of the following claims:

What is claimed is:

1. A disposable litter box defined by a foldable, closed container including a supply of litter, the container adapted to be unfolded in to a unitary litter box having a continuous outer perimeter wall of even height for defining an open-topped litter box, the box comprising:
   a. a flat, base made of a semi-rigid, non-stretchable, single-ply material;
   b. a plurality of primary fold lines on the base for folding the base into an assembled, open-topped box configuration having a closed bottom and upstanding side and end walls defining a continuous outer wall of even height;
   c. a plurality of secondary fold lines on the base for folding the assembled, open-topped box configuration, the secondary fold lines positioned such that when the base is folded along said secondary fold lines the base is biased into a closed container configuration and when unfolded along said secondary fold lines the base is biased into the open-topped box configuration, said secondary fold lines comprising double fold lines wherein the double fold lines produce an over-center type hinged closure mechanism holding the box in either the closed container configuration of the open-topped configuration; and d. visual identification elements on the base for positioning the secondary fold lines relative to one another to properly fold the base into the closed container configuration.

2. The disposable litter box of claim 1, wherein the end walls of the box are of double ply thickness when the base is folded into the open-topped box configuration.

3. The disposable litter box of claim 1, further including a supply of granular litter confined in the closed container when the box is folded into the closed container configuration and adapted to spread throughout the box when the base is in the open-topped box configuration.

4. The disposable litter box of claim 1, wherein the base is constructed of a paperboard sheet.

5. The disposable litter box of claim 1, wherein the base is constructed of a biodegradable material.

6. The disposable litter box of claim 3, further including a container for housing the granular litter inside the closed container configuration.

7. The disposable litter box of claim 1, the base further comprising:
   a. a substantially rectangular center section having opposite side and end edges;
   b. a pair of substantially rectangular inner end sections, one adjacent to each end edge of the center section, each end inner section having one edge common with the adjacent end edge and an outer edge parallel to said one edge;
   c. a pair of substantially rectangular outer end sections, one adjacent to each outer edge of one of said inner end sections;
   d. a pair of substantially rectangular side sections, one adjacent to each side edge of the center section, each side section having one edge common with the adjacent side edge of the center section and an outer edge parallel thereto, and each side section having outer end edges adjacent to and in substantially linear alignment with the outer edges of the inner end sections;
   e. a plurality of parallel, spaced-apart major fold lines in the center section and parallel to the end edges of the center section, said fold lines extending across the rectangular side sections;
   f. a plurality of spaced-apart minor fold lines in each rectangular side section extending from the intersection of one end edge of the center section and each major fold line to the outer edge of the respective side section.

8. The disposable litter box of claim 7, further including biasing fold lines disposed between selected minor fold lines and the respective major fold lines and extending the intersection thereof and the outer edge of the respective side section.

9. The disposable litter box of claim 7, wherein the end walls of the box are of double ply thickness when the base is folded into the open-topped box configuration.

10. The disposable litter box of claim 7, further including a supply of granular litter confined in the closed container when the box is folded into the closed container configuration and adapted to spread throughout the box when the base is in the open-topped box configuration.

11. The disposable litter box of claim 7, wherein the base is constructed of a paperboard sheet.

12. The disposable litter box of claim 7, wherein the base is constructed of a biodegradable material.

13. The disposable litter box of claim 10, further including a second container for housing the granular litter inside the closed container configuration.

14. The disposable litter box of claim 7, wherein the visual indicator is a pair of artistic "cats" paws adapted to be positioned in overlying relationship when the base is properly folded into the closed container configuration.

15. The disposable litter box of claim 13, wherein the second container for housing the granular litter comprises a sealed pouch.

16. The disposable litter box of claim 7, wherein the each outer end section includes and outer edge having an integral tab extending therefrom and wherein the center section further includes a tab receptive slot corresponding to each tab for holding the base in the open-topped box configuration.

* * * * *